(12) United States Patent
DeStefano et al.

(10) Patent No.: US 8,926,223 B1
(45) Date of Patent: Jan. 6, 2015

(54) FLOATABLE BUILDING FOUNDATION

(71) Applicants: Philip DeStefano, Verona, NJ (US);
John Bianco, Verona, NJ (US); Robert Caruso, Brick, NJ (US)

(72) Inventors: Philip DeStefano, Verona, NJ (US);
John Bianco, Verona, NJ (US); Robert Caruso, Brick, NJ (US)

( * ) Notice: Subject to any disclaimer, the term of this patent is extended or adjusted under 35 U.S.C. 154(b) by 0 days.

(21) Appl. No.: 14/055,246

(22) Filed: Oct. 16, 2013

(51) Int. Cl.
*E02D 27/32* (2006.01)

(52) U.S. Cl.
USPC ........ 405/196; 405/195.1; 405/219; 114/264; 52/169.9

(58) Field of Classification Search
USPC .............. 405/195.1, 196, 198, 203, 218, 219, 405/221; 114/44, 45, 48, 264, 265; 52/1, 52/64, 169.1, 169.2, 169.9, 292
See application file for complete search history.

(56) References Cited

U.S. PATENT DOCUMENTS

| | | | |
|---|---|---|---|
| 4,375,931 A | 3/1983 | Erdt | |
| 4,427,127 A | 1/1984 | Kalkowski | |
| 5,140,923 A | 8/1992 | Wood | |
| 5,509,562 A | 4/1996 | Jolly | |
| 5,775,847 A * | 7/1998 | Carlinsky et al. | 405/229 |
| 6,695,542 B2 | 2/2004 | Stromberg et al. | |
| 7,563,056 B2 * | 7/2009 | Gambill | 405/196 |
| 7,921,604 B2 * | 4/2011 | Lino | 52/1 |

\* cited by examiner

*Primary Examiner* — Sean Andrish
(74) *Attorney, Agent, or Firm* — Thomas J. Germinario

(57) ABSTRACT

A floatable building foundation comprises a steel beam support frame platform with buoyancy provided by underlying pontoons and/or foam billets. Vertical movement of the platform in response to a storm surge is constrained by cuboidal column guides at the four corners. Each of the column guides comprises two tiers of square roller frames, within each of which is an I-beam engaged between the flanges on either side by two rollers supported on horizontal axes. The orientations of the I-beams and rollers alternate orthogonally at each corner of the platform, so that torques generated by uneven buoyancy are suppressed and do not result in jamming of the platform as it rises.

4 Claims, 5 Drawing Sheets

FLOATABLE BUILDING FOUNDATION

FIELD OF INVENTION

The present invention relates to the field of floating structures, and more particularly to pontoon-supported building foundations, the floatation of which is constrained by guide columns.

BACKGROUND OF THE INVENTION

Homes and other buildings located in shore areas are subject to the risk of damage and destruction from floodwaters associated with storm surges. Construction of foundations for homes/buildings above the flood hazard elevation is often not practical from a technical and/or economic standpoint. Even where foundation construction above historic flood levels is feasible, the trend toward increasingly powerful storm surges in recent years poses a risk to any building in proximity to a large body of water.

One potential approach to minimize the risks associated with storm surges is to design a floating foundation that can rise and fall with the flood water level. While designs for pontoon-supported floating structures are known, the problem of maintaining a level platform under condition of variable and/or unevenly-distributed buoyancy has heretofore not been satisfactorily solved.

SUMMARY OF THE INVENTION

The present invention comprises a steel beam support frame platform with buoyancy provided by underlying pontoons and/or foam billets. Vertical movement of the platform in response to a storm surge is constrained by cuboidal column guides at the four corners. Each of the column guides comprises two tiers of square roller frames, within each of which is an I-beam engaged between the flanges on either side by two rollers supported on horizontal axes. The orientations of the I-beams and rollers alternate orthogonally at each corner of the platform, so that torques generated by uneven buoyancy are suppressed and do not result in jamming of the platform as it rises.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

DETAILED DESCRIPTION OF THE PREFERRED EMBODIMENT

Figure 1:
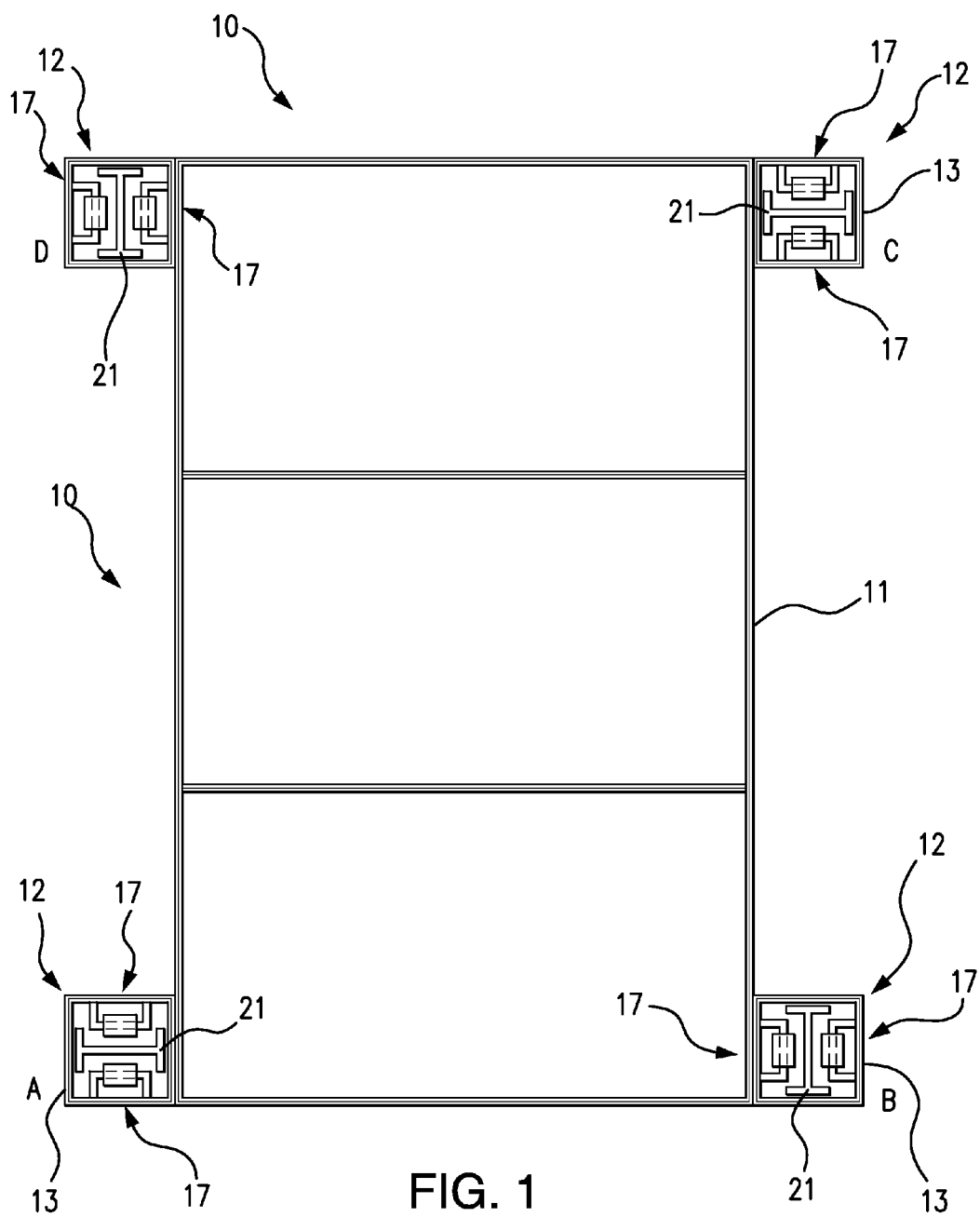
FIG. 1 is a plan view of a floatable house foundation support according to the preferred embodiment of the present invention.
Figure 2:
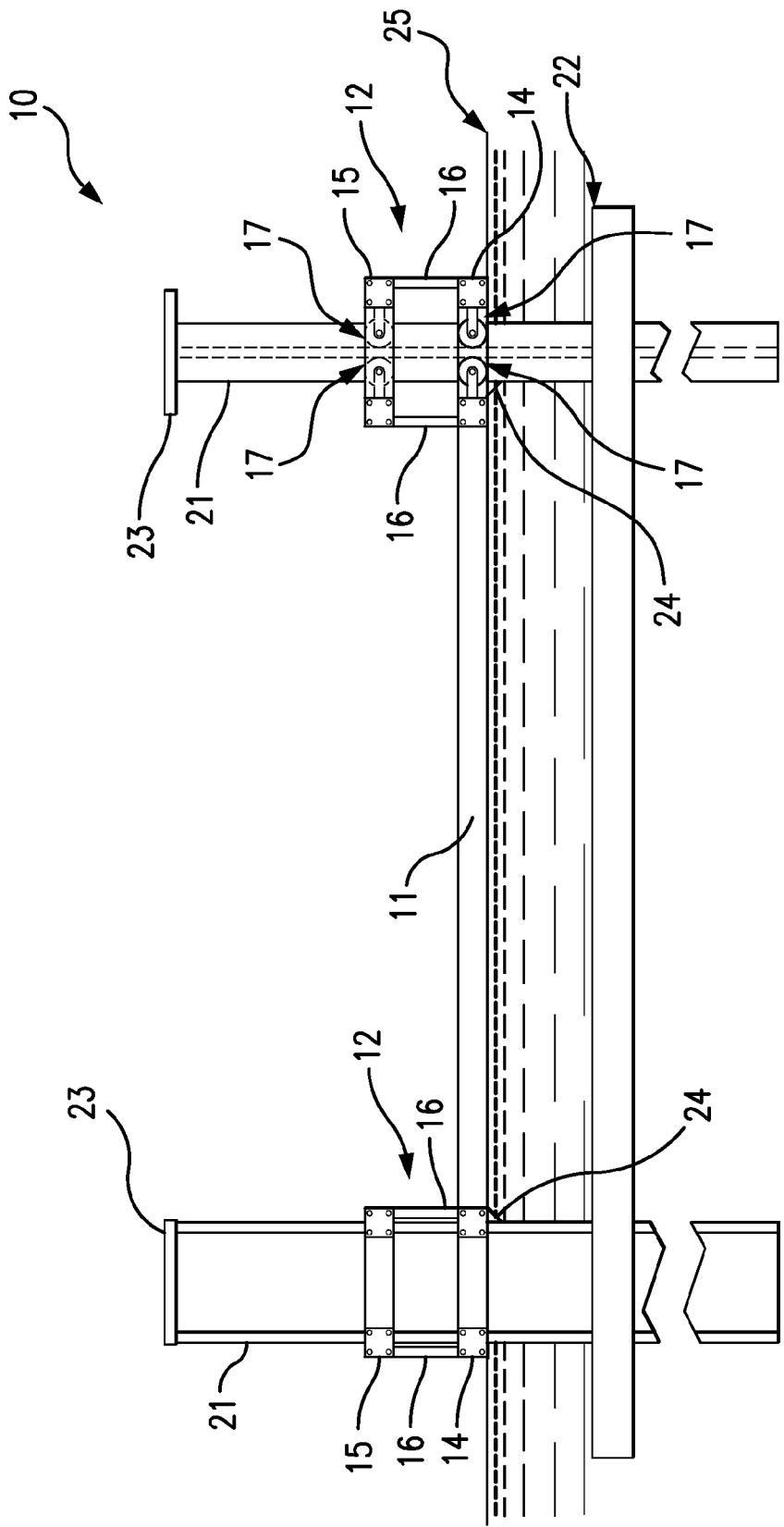
FIG. 2 is a side profile view of a floatable house foundation support according to the preferred embodiment of the present invention.

Referring to FIGS. 1 and 2, a floatable building foundation according to the preferred embodiment of the present invention 10 comprises a rectangular steel foundation support platform 11 with four cuboidal column guides 12, one at each corner. Each of the cuboidal column guides 12 comprises two interconnected square roller frames 13: a first tier roller frame 14 at the level of the foundation support platform 11, and a second tier roller frame 15 several feet above the level of the foundation support platform 11. The first and second tier roller frames 13 are rigidly interconnected at the corners by vertical members 16, so as to form an open cuboidal structure 12.

Figure 5:
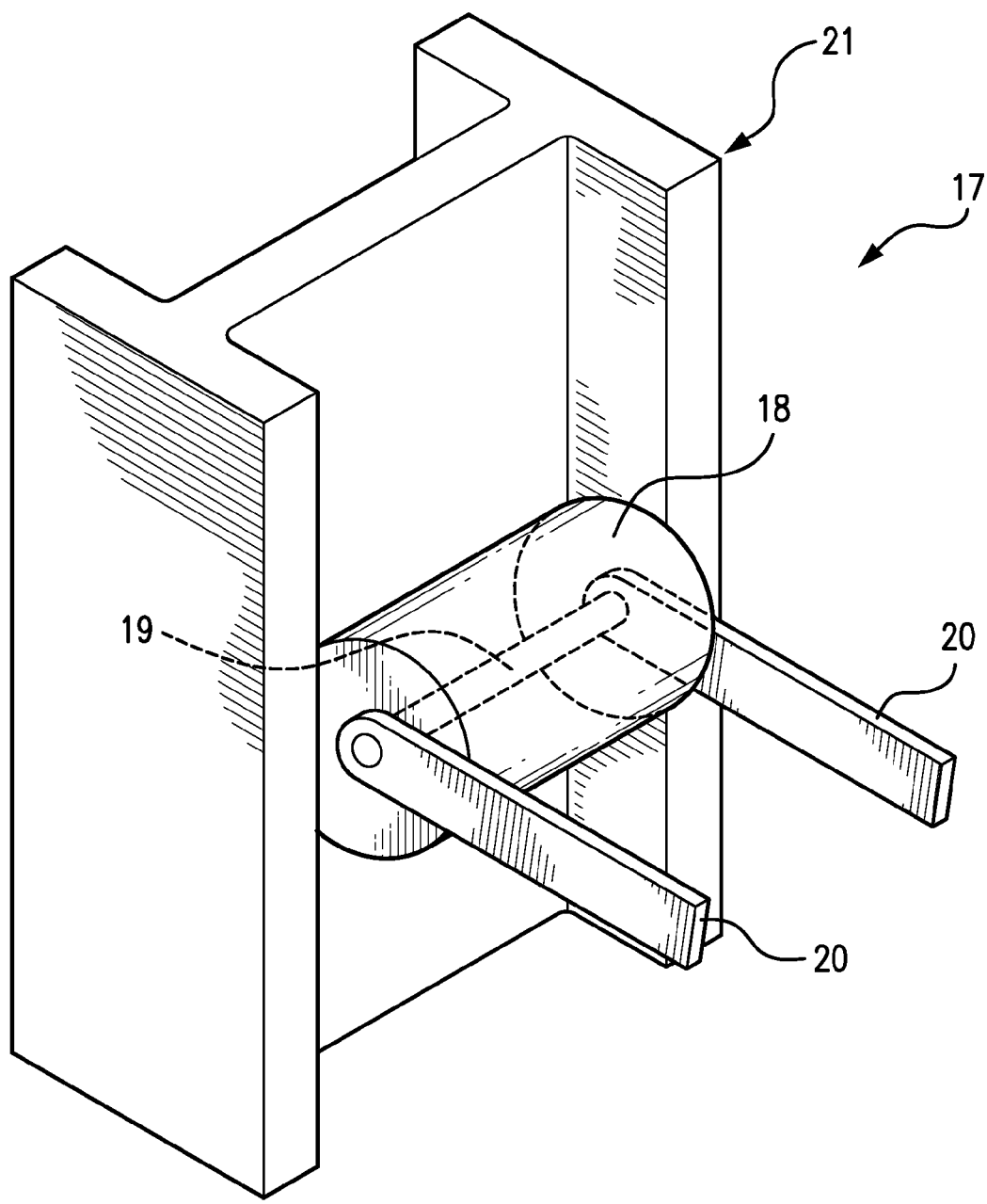
FIG. 5 is a perspective detail view of a roller mechanism according to the preferred embodiment of the present invention.

As best shown in FIG. 1 and in the detail view of FIG. 5, each roller frame 13 contains within it two roller mechanisms 17 on opposing sides on the roller frame 13. Each roller mechanism 17 comprises a cylindrical roller 18 having an axial bore 19, through which it is horizontally rotatably supported by a roller rod 20 attached to the roller frame 13. The opposing rollers 18 of each roller frame 13 slidably engage the opposing faces of a flanged column beam 21.

Four flanged column beams 21 are vertically disposed at each corner of the foundation support platform 11 and are securely anchored in footings below the underlying grade elevation 22. As described above, each of the cuboidal column guides 12 slidably encompasses a section of one of the column beams 21, such that the foundation support platform 11 can ride up and down along the column beams 21. The range of such motion is limited by column caps 23 at the top of the column beams 21 and frame stop blocks 24 laterally extending from the column beams 21 at a pre-determined non-floating platform elevation 25.

Figure 3:
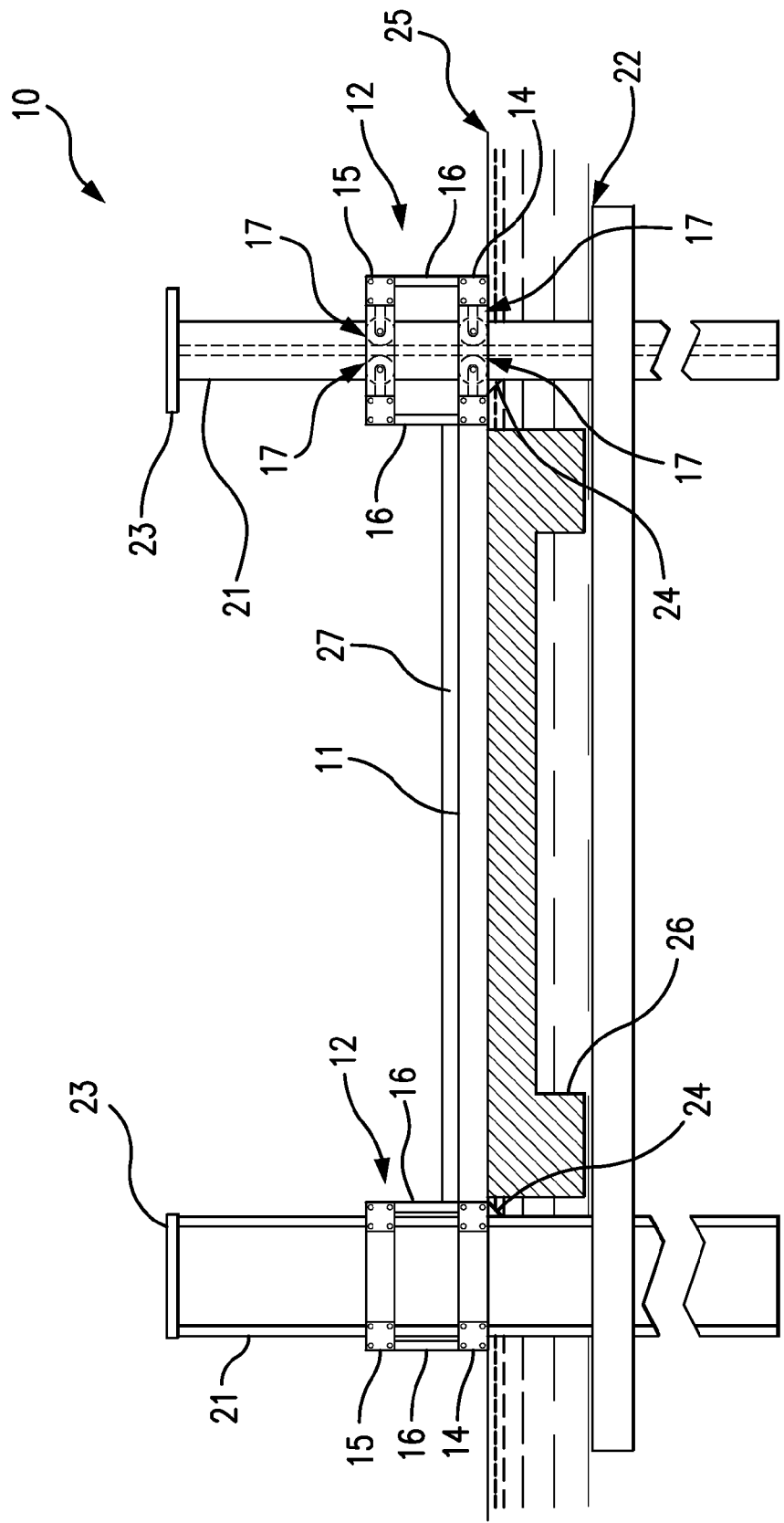
FIG. 3 is a side profile view of a house section supported on a floatable house foundation support according to the preferred embodiment of the present invention.

Referring to FIG. 3, the floatable building foundation 10 is depicted in the non-floating condition, with the foundation support platform 11 resting on the frame stop blocks 24 above one or more buoyant pontoons 26 attached to the bottom of the foundation support platform 11 with a clearance above the underlying grade 22. The pontoon(s) 26 can be made of polyethylene or other buoyant non-water-permeable material, and their size and shape are based on buoyancy calculations specific to the weight distribution of the building to be floated.

The total buoyancy of the pontoon(s) 26 should exceed the weight of the building and the foundation support platform 11 sufficiently to give the pontoon(s) a freeboard of several feet. The center of buoyancy for the pontoon(s) 26 should align with the overall center of gravity of the building and foundation support platform 11, in order to avoid the generation of torques, which would otherwise cause the foundation support platform 11 to rise unevenly and tend to cause jamming of the roller frames 13 on the column beams 21.

Since lateral forces associated with a storm surge may also subject the foundation support platform 11 to torques, the preferred embodiment of the present invention 10 minimizes the risk of torque-induced jamming of the roller frames 13 in two ways. First, the roller frames 13 are incorporated into the cuboidal column guides 12, in which the rigid vertical members 16 resist any torque that would tend to rotate the roller frames 13 out of the horizontal plane and thereby deform the cuboidal structure of the column guides 12. Second, as best seen in FIG. 1, the orientation of the column beams 21 alternates orthogonally at each corner of the foundation support platform 11, so that the roller frame 13 of one corner is always immobile with respect to torques which would cause the roller frame 13 of the opposite corner to slide. For example, referring to FIG. 1, a clockwise transverse torque (tending to rotate the platform 11 from side AD toward side BC) would encounter immobility in corners A and C, where the column beams 21 are orthogonal to their counterparts in corners B and D. Conversely, a clockwise longitudinal torque (tending to rotate the platform 11 from side AB toward side CD) would encounter immobility in corners B and D.

Figure 4:
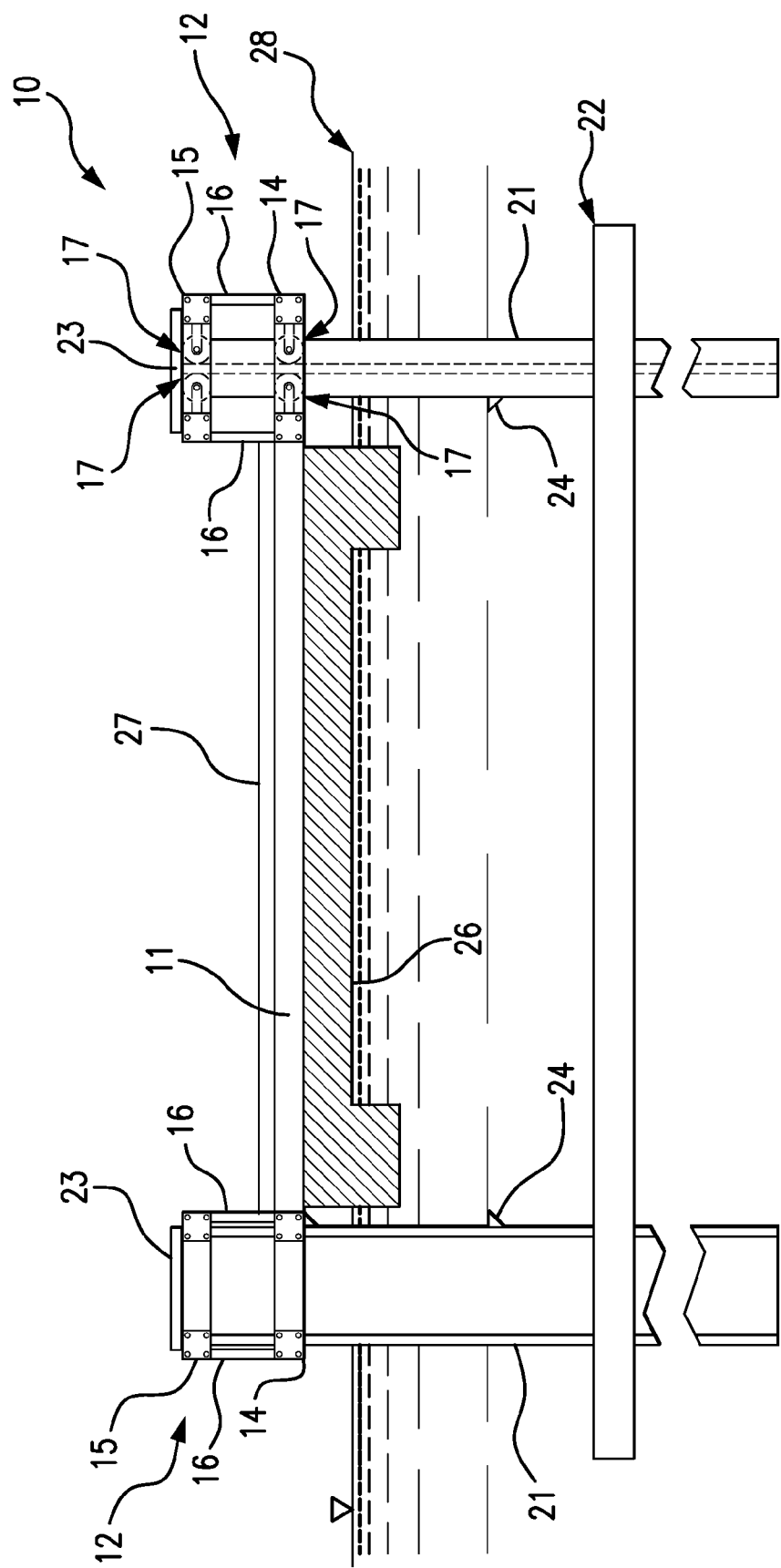
FIG. 4 is a side profile view of a house section floating on a floatable house foundation support according to the preferred embodiment of the present invention.

Referring to FIGS. 3 and 4, the floor joist 27 of the building is supported on the foundation support platform 11. In the floating condition, depicted in FIG. 4, the buoyancy of the pontoon(s) supports the platform 11 above the elevation of the flood waters 28, thereby preventing flood damage to the building. When the flood waters recede, the cuboidal column guides 12 allow the platform 11 to slide back down, in response to gravity, to its non-floating elevation 25.

Although the preferred embodiment of the present invention has been disclosed for illustrative purposes, those skilled in the art will appreciate that many additions, modifications and substitutions are possible, without departing from the scope and spirit of the present invention as defined by the accompanying claims.

What is claimed is:

1. A floatable foundation for a building comprising:
    a rectangular steel foundation support platform, having four corners, and having a lower surface and an upper surface on which the building rests;
    four cuboidal column guides, each attached to one of the corners of the foundation support platform, wherein each cuboidal column guide comprises two rectangularly interconnected square roller frames, consisting of a first tier roller frame, which is horizontally aligned with the foundation support platform, and a second tier roller frame, which is at a level above that of the foundation support platform, and wherein each roller frame contains a pair of opposing roller mechanisms, each roller mechanism comprising a cylindrical roller, which is horizontally rotatably supported through an axial bore by a roller rod attached to the respective roller frame;
    four vertical flanged column beams, located at the four corners of the foundation support platform, each column beam having an upper and a lower terminus, with the lower terminus secured below an underlying grade elevation, and each column beam having two opposing faces disposed between two end flanges, wherein the paired roller mechanisms of each roller frame slidably engage the two opposing faces of one of the column beams, such that the foundation support platform has a slidable range of floatation upward and downward along the column beams, and wherein the upward range of floatation is constrained by four column caps located at the upper terminus of each column beam, and wherein the downward range of floatation is constrained by four frame stop blocks laterally extending from the column beams at a non-floating platform elevation;
    one or more buoyancy structures attached to the lower surface of the foundation support platform, such that, when inundated by flood waters at a flood elevation, the buoyancy structures exert a buoyancy, which causes the foundation support platform to slide upward along the column beams to a floating platform elevation above the flood elevation, and which supports the building and the foundation support platform at the floating platform elevation, thereby preventing flood damage to the building; and
    wherein the first tier roller frames and the second tier roller frames are rigidly interconnected at four corners by perpendicular vertical members, so as to form the cuboidal column guides as open cuboidal structures, and such that the vertical members resist any torque that tends to rotate the roller frames out of the horizontal plane or that tends to deform the cuboidal structures of the cuboidal column guides, thereby reducing the likelihood of jamming of the roller frames on the column beams.

2. The floatable foundation for a building according to claim 1, wherein the buoyancy structures are designed to exert a total buoyancy sufficient to sustain a floating freeboard of at least three feet between the floating platform elevation and the flood elevation.

3. The floatable foundation for a building according to claim 2, wherein the buoyancy structures are designed to have an overall center of buoyancy that is vertically aligned with an overall center of gravity of the building and foundation support platform, so as to avoid generation of torques, which would otherwise tend to cause the foundation support platform to slide upward unevenly and tend to cause jamming of the roller frames on the column beams.

4. The floatable foundation for a building according to claim 3, wherein the column beams have orientations that alternate orthogonally at each corner of the foundation support platform, so that the roller frames of one corner are immobile with respect to a torque which would cause the roller frames of the opposite corner to slide, thereby reducing the likelihood of jamming of the roller frames on the column beams.

* * * * *